(12) United States Patent
Langenfeld

(10) Patent No.: US 8,517,159 B1
(45) Date of Patent: *Aug. 27, 2013

(54) BRAKE ACTUATION ASSEMBLY

(75) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/295,672

(22) Filed: Nov. 14, 2011

Related U.S. Application Data

(63) Continuation of application No. 12/057,874, filed on Mar. 28, 2008, now Pat. No. 8,057,335.

(60) Provisional application No. 60/909,789, filed on Apr. 3, 2007.

(51) Int. Cl.
*B62D 11/08* (2006.01)
*F16H 7/08* (2006.01)

(52) U.S. Cl.
USPC .......................... 192/224.2; 474/139; 180/6.2

(58) Field of Classification Search
USPC ...................................... 192/224.2
See application file for complete search history.

(56) References Cited

U.S. PATENT DOCUMENTS

| | | | |
|---|---|---|---|
| 151,110 A | 5/1874 | Farley | |
| 833,067 A | 10/1906 | Ling | |
| 3,788,078 A | 1/1974 | Rubinstein | |
| 4,068,052 A | 1/1978 | Weimer et al. | |
| 4,350,237 A | 9/1982 | Coleman | |
| 5,042,626 A | 8/1991 | Dohse et al. | |
| 5,146,735 A * | 9/1992 | McDonner | 56/11.3 |
| 6,141,947 A | 11/2000 | Borling | |
| 6,199,354 B1 * | 3/2001 | King et al. | 56/11.3 |
| 6,282,873 B1 | 9/2001 | Wilken | |
| 6,672,058 B1 | 1/2004 | Langenfeld et al. | |
| 6,775,976 B1 | 8/2004 | Phanco et al. | |
| 7,011,188 B2 | 3/2006 | Scheuring, III et al. | |
| 7,121,388 B2 | 10/2006 | Ring et al. | |
| 7,134,276 B1 | 11/2006 | Langenfeld et al. | |
| 7,255,193 B2 | 8/2007 | Miller et al. | |
| 8,057,335 B1 * | 11/2011 | Langenfeld | 474/139 |
| 2007/0271895 A1 * | 11/2007 | Nogami et al. | 56/17.1 |

FOREIGN PATENT DOCUMENTS

JP 2000-104800 A * 4/2000

* cited by examiner

*Primary Examiner* — Rodney Bonck
(74) *Attorney, Agent, or Firm* — Neal, Gerber & Eisenberg LLP

(57) ABSTRACT

An emergency braking system for use in connection with a drive apparatus including a drive belt and pulley system for transferring power from a prime mover to a transmission or transaxle. The braking system includes a pulley engaged to the drive belt and a spring engaged to the pulley to provide a bias force thereto. When tension from the belt is removed from the pulley, the spring forces the pulley into engagement with an actuator to engage a brake mechanism.

23 Claims, 9 Drawing Sheets

BRAKE ACTUATION ASSEMBLY

CROSS REFERENCE TO RELATED APPLICATIONS

This application is a continuation of U.S. patent application Ser. No. 12/057,874, filed Mar. 28, 2008, which claims the priority of U.S. Provisional Patent Application Ser. No. 60/909,789 filed on Apr. 3, 2007. The prior applications are incorporated herein by reference in their entirety.

BACKGROUND OF THE INVENTION

This invention relates to powered vehicles, including a brake and an emergency brake actuation assembly for use in connection therewith. The invention is disclosed herein in connection with a zero-turn mower device including two hydrostatic transmissions powered by a prime mover. It will be understood that other embodiments could be used in connection with the inventions disclosed herein.

SUMMARY OF THE INVENTION

This invention discloses a system by which the brake mechanism of a belt-driven hydrostatic transaxle or other drive device may be activated automatically in the event the drive belt breaks during operation. As will be understood, transaxles such as those shown herein will generally have a brake mechanism used as a parking brake, and such brakes are generally not intended for use as a dynamic brake. Dynamic braking is usually provided by the hydraulic system and the user may alter the output of the hydraulic apparatus to effectively brake the vehicle. Such hydrostatic transaxles including a parking brake mechanism are disclosed, for example, in commonly owned U.S. Pat. Nos. 6,672,058 and 6,775,976, the terms of which are incorporated herein by reference, including in particular the details of the brake and hydraulic transmission. It will be understood, however, that while this invention is described herein as being used with a parking brake, the invention is not so limited and could be used with other brake mechanisms.

When the drive belt for such a drive apparatus breaks during operation, the vehicle can free wheel down a slope. If the operator strokes the controls to neutral, the normal hydraulic braking will slow the vehicle. If the operator overcorrects by stroking the controls in the opposite direction, the vehicle can continue to free wheel. At that moment, though, the operator may not consider applying the parking brake, as it is normally not used during vehicle operations. Thus, a need for an automatic braking system is presented to provide for emergency braking in such a situation, and the present invention provides such a system.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

The description that follows illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only in the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
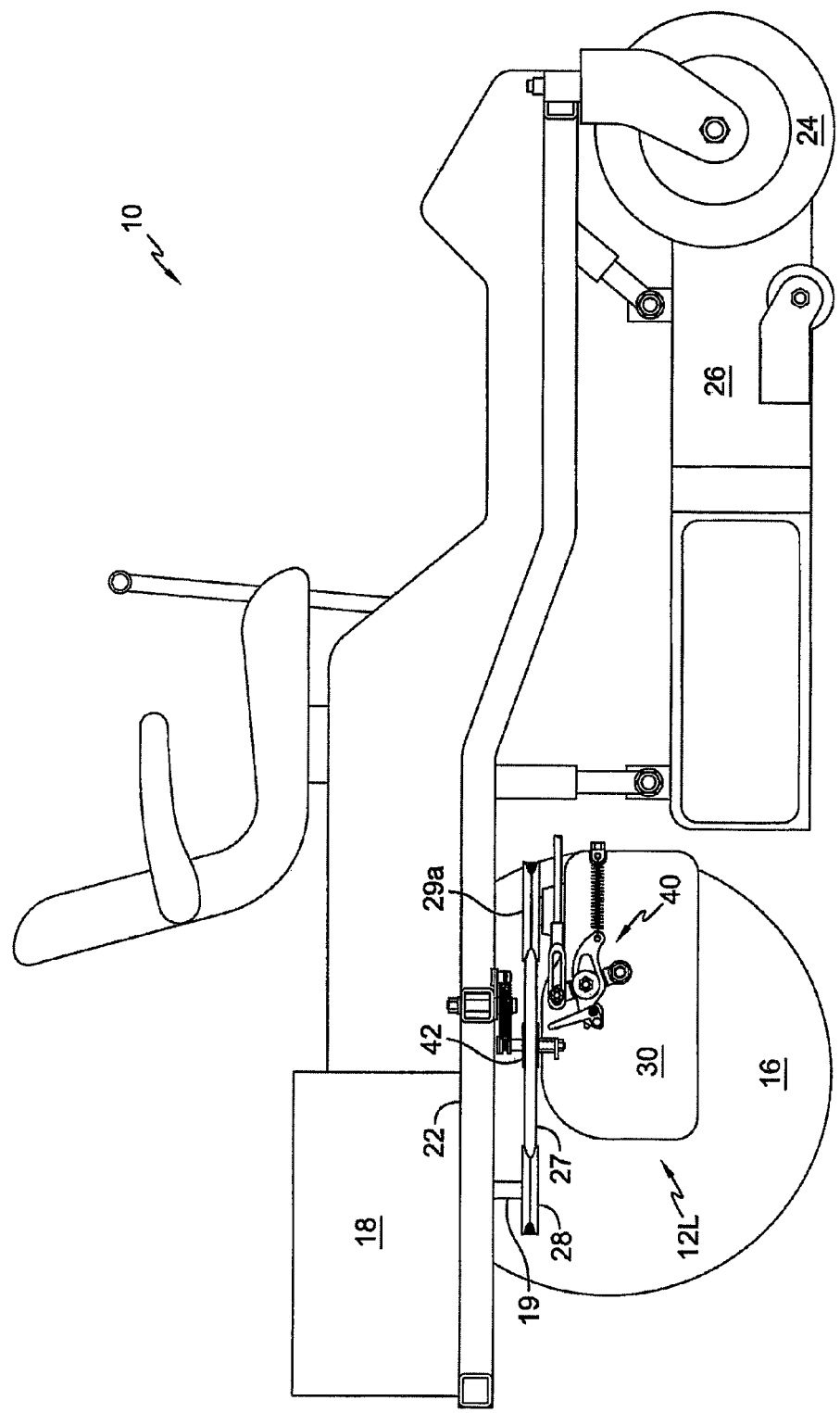
FIG. 1 is an elevational view of a vehicle incorporating an embodiment of the brake apparatus in accordance with the principles of the present invention, with certain elements removed for clarity.
Figure 2:
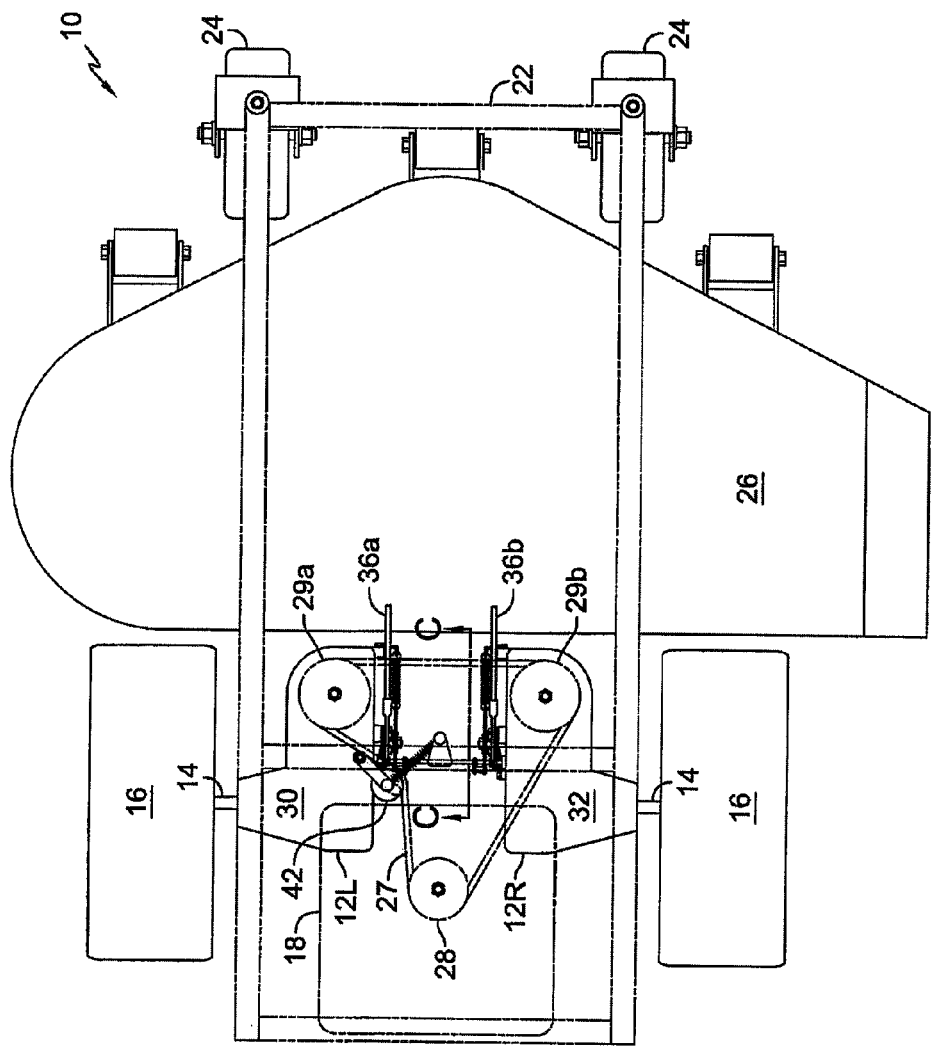
FIG. 2 is a top plan view of a portion of the vehicle of FIG. 1 showing the frame and other components, with certain elements removed for clarity.

FIG. 1 shows a vehicle 10 incorporating a first embodiment of the present invention. As shown in FIGS. 1 and 2, vehicle 10 is a mowing vehicle, which includes a prime mover 18, a frame 22, a set of pivotable front casters 24 and a mower deck 26. Vehicle 10 also includes a pair of transaxles or transmissions 12L and 12R that independently drive a pair of output axles 14, which in turn, each drive one of a pair of wheels 16 that provide motion to vehicle 10. While the embodiment shown and described herein utilizes hydrostatic transmissions, this invention is also applicable to other types of drive systems, such as, for example, continuously variable drive systems, continuously variable transmissions (CVTs) and hydraulic drive systems with a variable pump or motor. Accordingly, the terms "transmission" and "transaxle" are used herein for convenience and are not used to limit the present invention. Furthermore, although a mowing vehicle is shown in FIG. 1, the present invention can be applied to other vehicle types as well. A drive pulley 28 is mounted on and driven by output shaft 19 of prime mover 18, and a belt 27 is used to connect drive pulley 28 with transaxle pulleys 29a and 29b.

A pair of transaxles 12L, 12R are mounted on frame 22, each comprising a transaxle housing 30, 32 and an output axle 14 to drive one of the rear wheels 16 of mower 10. In the depicted embodiment, transaxles 12L, 12R are similar to those depicted in commonly owned U.S. Pat. No. 7,134,276, the terms of which are incorporated herein by reference, including in particular the details of the hydraulic transmission disclosed therein. Transaxles 12L, 12R are intended to be internally identical, and can also be externally identical but for the brake actuation mechanism as described herein. Thus, the description herein will focus on transaxle 12L, on the left side of mower 10 as shown in FIG. 2, and the elevational view of FIG. 1 has transaxle 12R removed so that one can see the external structure of transaxle 12L, including emergency brake actuation mechanism 40, in greater detail.

Figure 3:
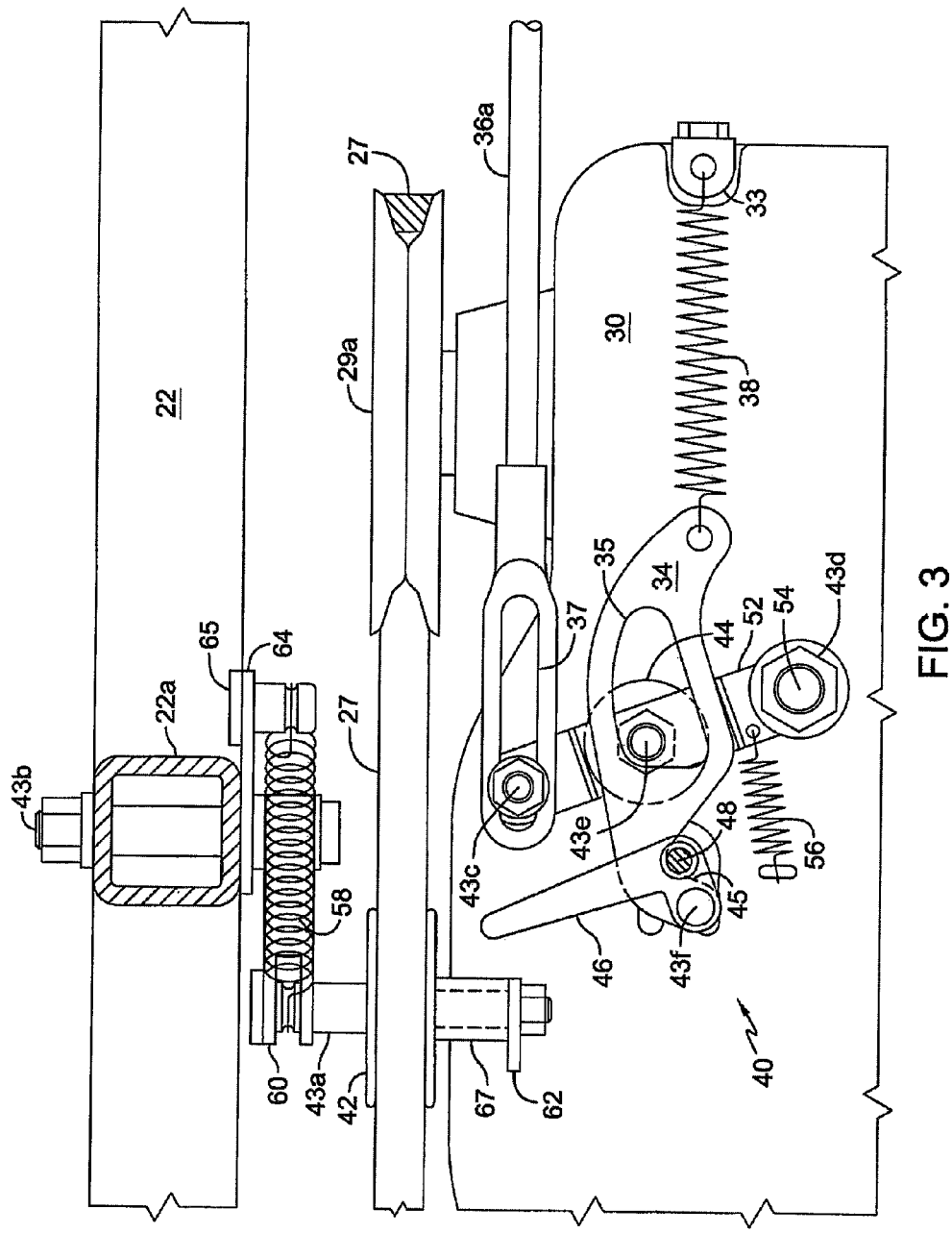
FIG. 3 is an elevational view of the components of a brake mechanism in accordance with the principles of the present invention, with the emergency brake actuator in the non-activated position.

In the embodiment depicted in FIGS. 1, 2 and 3, brake linkage 36a is intended to activate an internal brake (not shown) in transaxle 12L, and movement of brake linkage 36a to the right in FIG. 3 will activate the brake by rotating pivot rod 54 for this internal brake. Linkage 36a also includes a slot 37 in one end thereof to engage a fastener 43c secured to brake arm 52, so that movement of linkage 36a to the right in FIG. 3 will cause rotation of brake arm 52 clockwise about the pivot point through fastener 43d. Bias spring 56 also acts to retain brake arm 52 in the deactivated position. It will be understood that additional linkages will be used to connect linkages 36a, 36b to the appropriate foot pedal or hand control (not shown) on vehicle 10; such additional linkages are not depicted for clarity.

Slot 35 in clamp arm 34 permits the activation of brake arm 52 by movement of linkage 36a without movement of clamp arm 34 and therefore without the activation of emergency brake mechanism 40. Similarly, slot 37 in linkage 36a also permits the emergency brake mechanism 40 to be activated, as will be described below, without moving linkage 36a.

As will be understood, pulley 29a is connected to an input shaft (not shown) to drive an internal hydraulic pump (not shown). This hydraulic pump could be of the axial piston type such as is shown in U.S. Pat. No. 7,134,276 previously referenced, but the particular type of pump or hydrostatic transmission is not critical to this invention. Pulleys 29a, 29b are thus used to respectively drive transaxles 12L, 12R, and are powered by belt 27 driven by drive pulley 28. As is generally known, an idler pulley 42 is also used to engage belt 27 to provide the appropriate tension in the belt. FIGS. 1, 2 and 3 show this arrangement during normal operation.

The emergency brake mechanism 40 comprises a moveable assembly including swing arm 60 on which idler pulley 42 is mounted by means of a fastener 43a; swing arm 60 pivots about the point at which a fastener 43b connects swing arm 60 to transverse frame member 22a. Swing arm 60 and idler pulley 42 are retained in the operative mode as shown in, e.g., FIG. 3 by the tension of belt 27. It will be understood that the term fastener is being used generically herein, and various means of connecting these elements can be used, along with sleeves, spacers and the like that may be depicted but need not be described for one of skill in the art.

Figure 4:
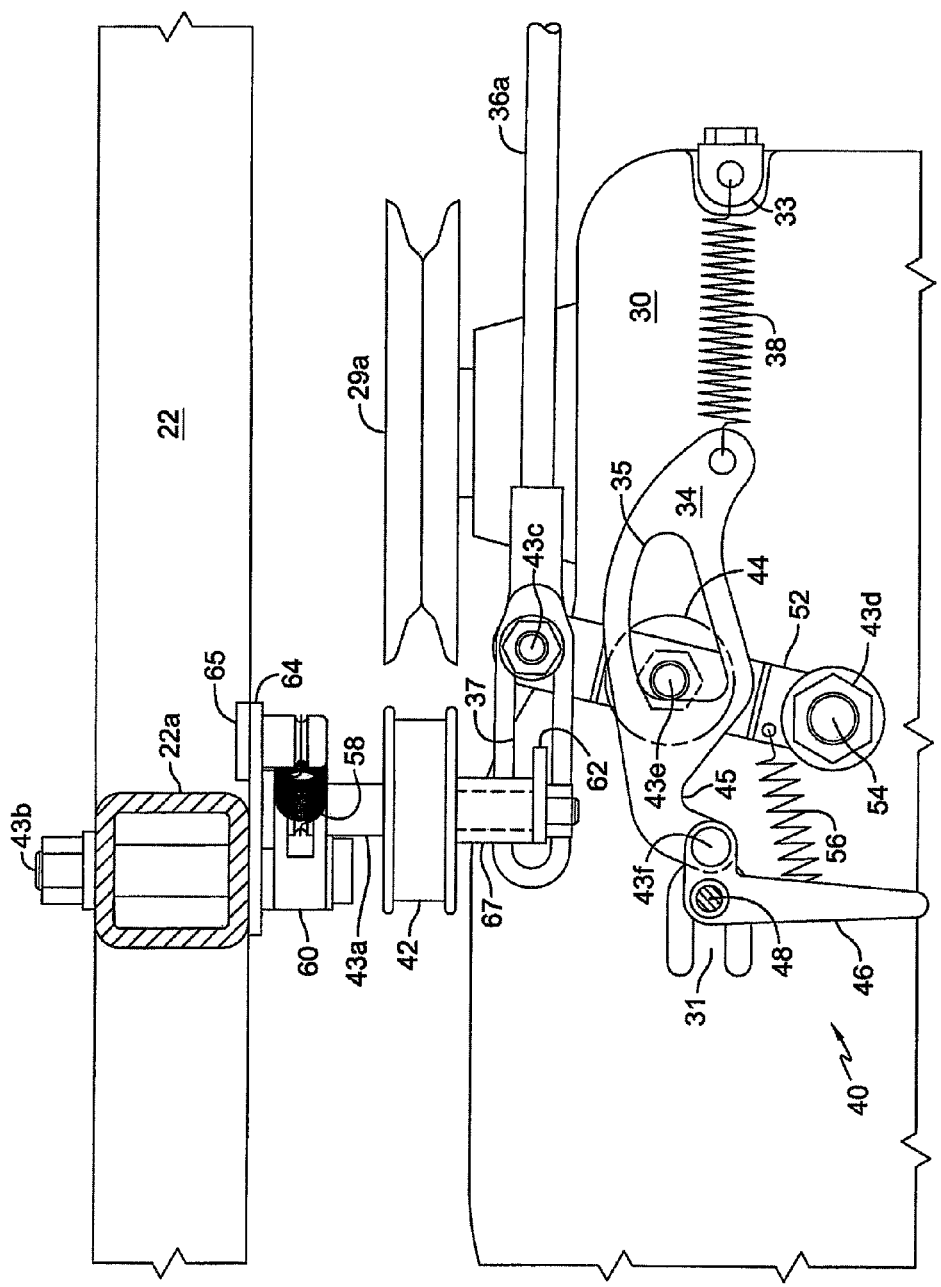
FIG. 4 is a view similar to FIG. 3 with the emergency brake actuator in the activated position.
Figure 5:
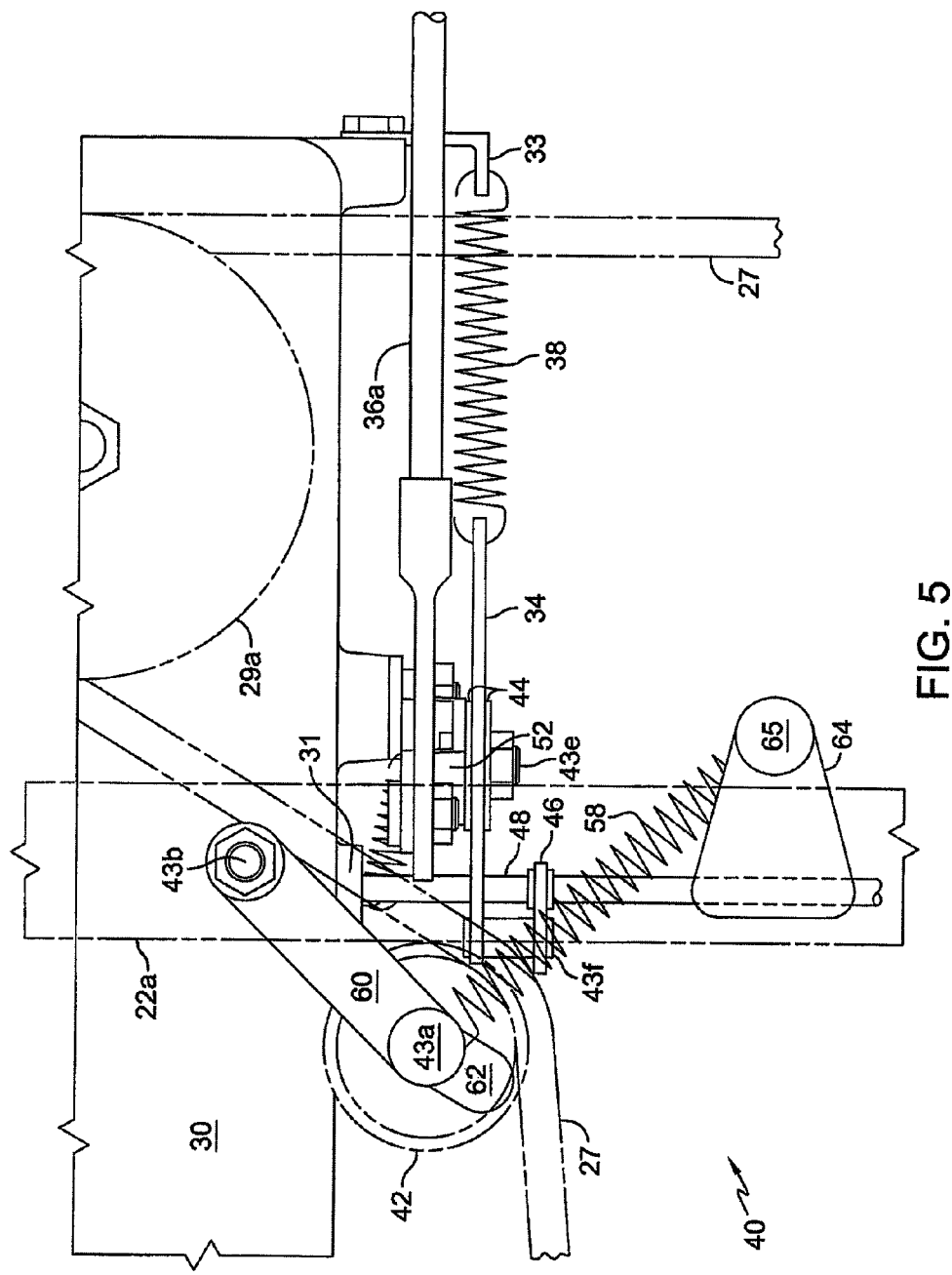
FIG. 5 is a top plan view of the actuator of FIG. 3 with the emergency brake actuator in the non-activated position.
Figure 6:
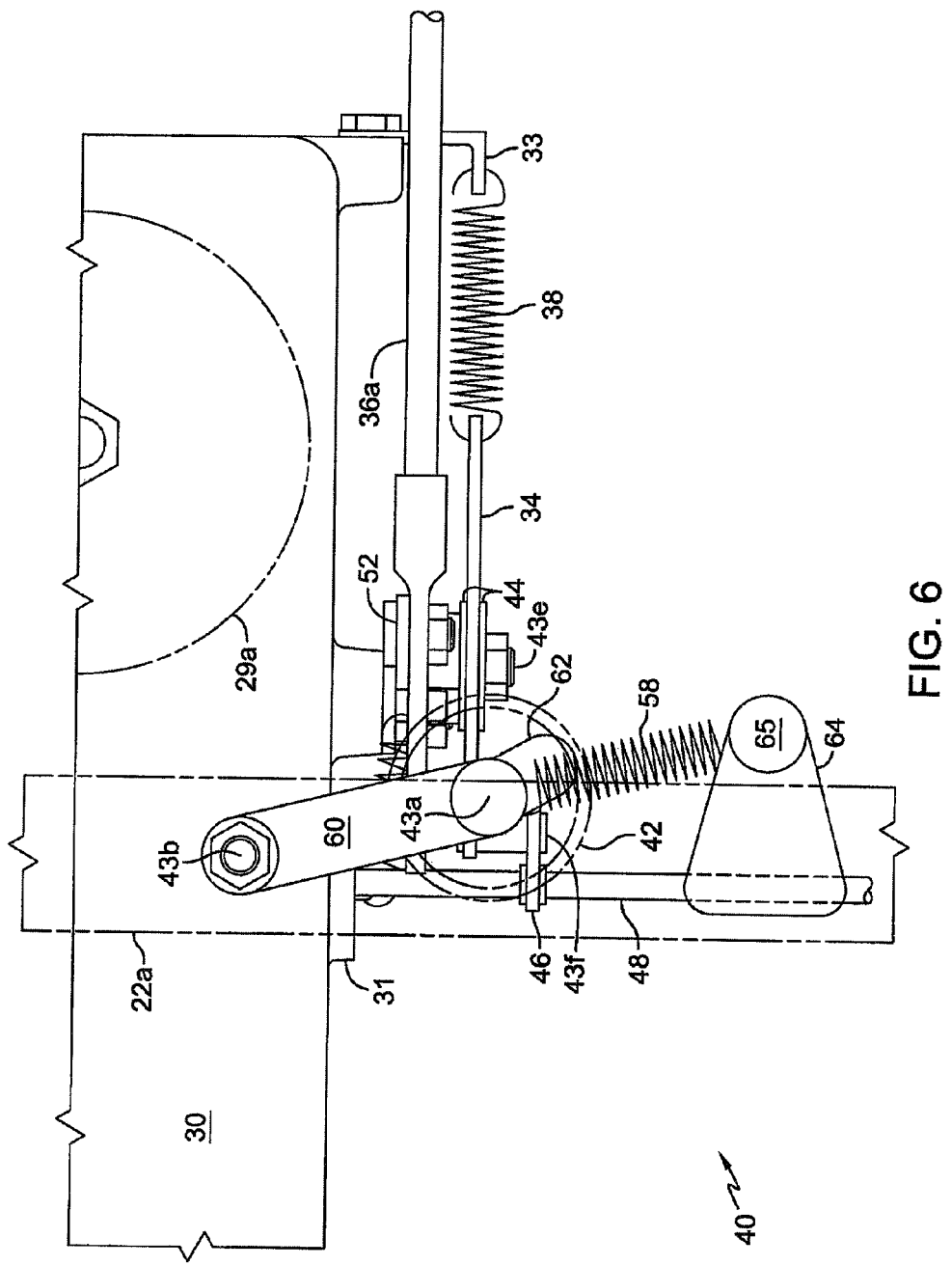
FIG. 6 is a view similar to FIG. 5 with the emergency brake actuator in the activated position.

Emergency brake mechanism 40 further comprises clamp arm 34 which is capable of engaging brake arm 52 and forcing rotation of brake arm 52 clockwise to activate the braking system. Spring 38 is secured to clamp arm 34 and to a connection point or bracket 33 secured to transaxle housing 30. Any fixed structure could be used for this connection; spring 38 biases clamp arm 34 toward the activated position shown in FIG. 4. Clamp arm 34 is held in the deactivated position, as shown in FIG. 3, by means of a transverse rod 48 fixed to release arm 46 to form a latching mechanism of the over-center design. Rod 48 is held in pocket 31 formed on transaxle housing 30 and extends to a similar pocket (not shown) in the opposite transaxle housing 32 so that the brake mechanism on both transaxles are simultaneously engaged. Rod 48 engages recess 45 formed in clamp arm 34 so that clamp arm 34 is held in the deactivated position as shown in FIG. 3.

Emergency brake mechanism 40 further comprises a striker 62 attached to and moveable with idler pulley 42. Spacer 67 may be used to separate idler pulley 42 from striker 62. Tension spring 58 acts as a bias member to provide a bias force to swing arm 60. Spring 58 is engaged to idler pulley swing arm 60 and is also secured to bracket 64 and pin 65 in a manner so that a spring force is applied to swing arm 60. As noted previously, idler pulley 42 and swing arm 60 are held in the operative position (FIGS. 2 and 3) by belt 27. If belt 27 breaks, however, spring 58 pulls idler pulley 42 to cause rotation of swing arm 60 about its pivot axis, thereby causing striker 62 to contact release arm 46 with sufficient force to rotate release arm 46 and transverse rod 48 about the longitudinal axis of rod 48.

Figure 7:
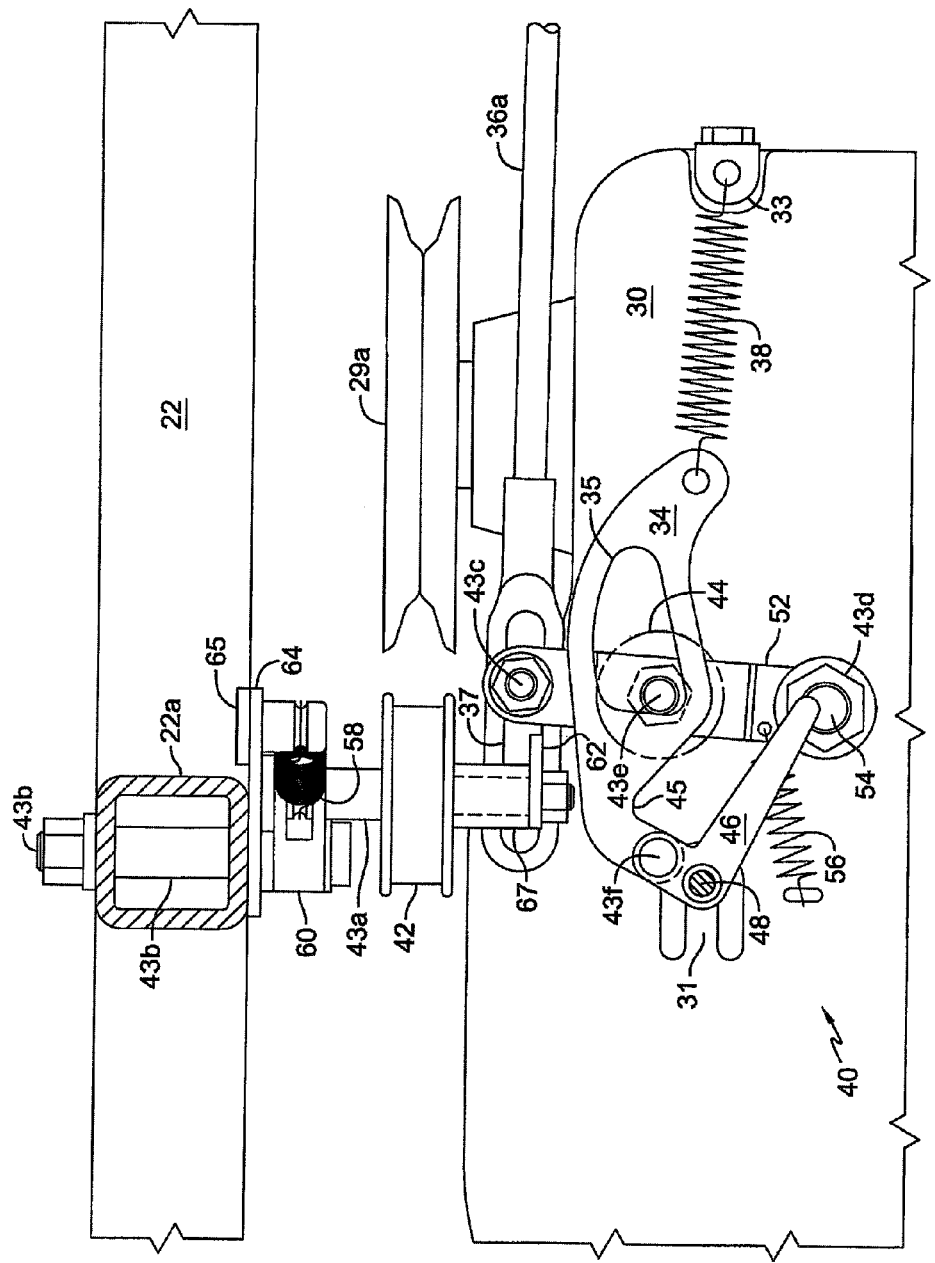
FIG. 7 is a view similar to FIG. 5, with the emergency brake actuator in an operative position between the fully activated and the non-activated positions.

Release arm 46 is secured to clamp arm 34 by means of a pivot joint fastener 43f, so that as release arm 46 rotates from the position in FIG. 3, clamp arm 34 is raised, to the position in FIG. 7, thereby lifting clamp arm 34 off transverse rod 48. This movement causes clamp arm 34 to be released from its over center-latched position, and the force of clamp arm spring 38 pulls clamp arm 34 to the right in FIG. 3. A fastener 43e and a pair of washers 44 on opposite sides of clamp arm 34 provide the engagement between slot 35 on clamp arm 34 and brake arm 52. Note that one of the washers 44 is not depicted in these figures for clarity. Thus, as clamp arm 34 is pulled to the right, slot 35 engages brake arm 52 and causes it to rotate clockwise, thereby rotating brake pivot rod 54 to cause braking of the system, as described previously.

As noted previously, emergency brake mechanism 40 used on second transaxle 12R is substantially the same as described above, as the rotation of transverse rod 48 will trigger movement of a similar clamp arm 34, to which rod 48 is similarly secured. This action will activate a second brake (not shown) internal to second transaxle housing 32 so that braking is provided to both transaxles 12L and 12R at the same time. Thus, it can be seen that a single emergency brake actuation mechanism 40 is used to actuate the brakes on both transaxles.

Depending on the vehicle application, additional vehicle frame stiffening members may be required to prevent the flexing of the vehicle frame during operation from damaging transverse rod 48.

Figure 8:
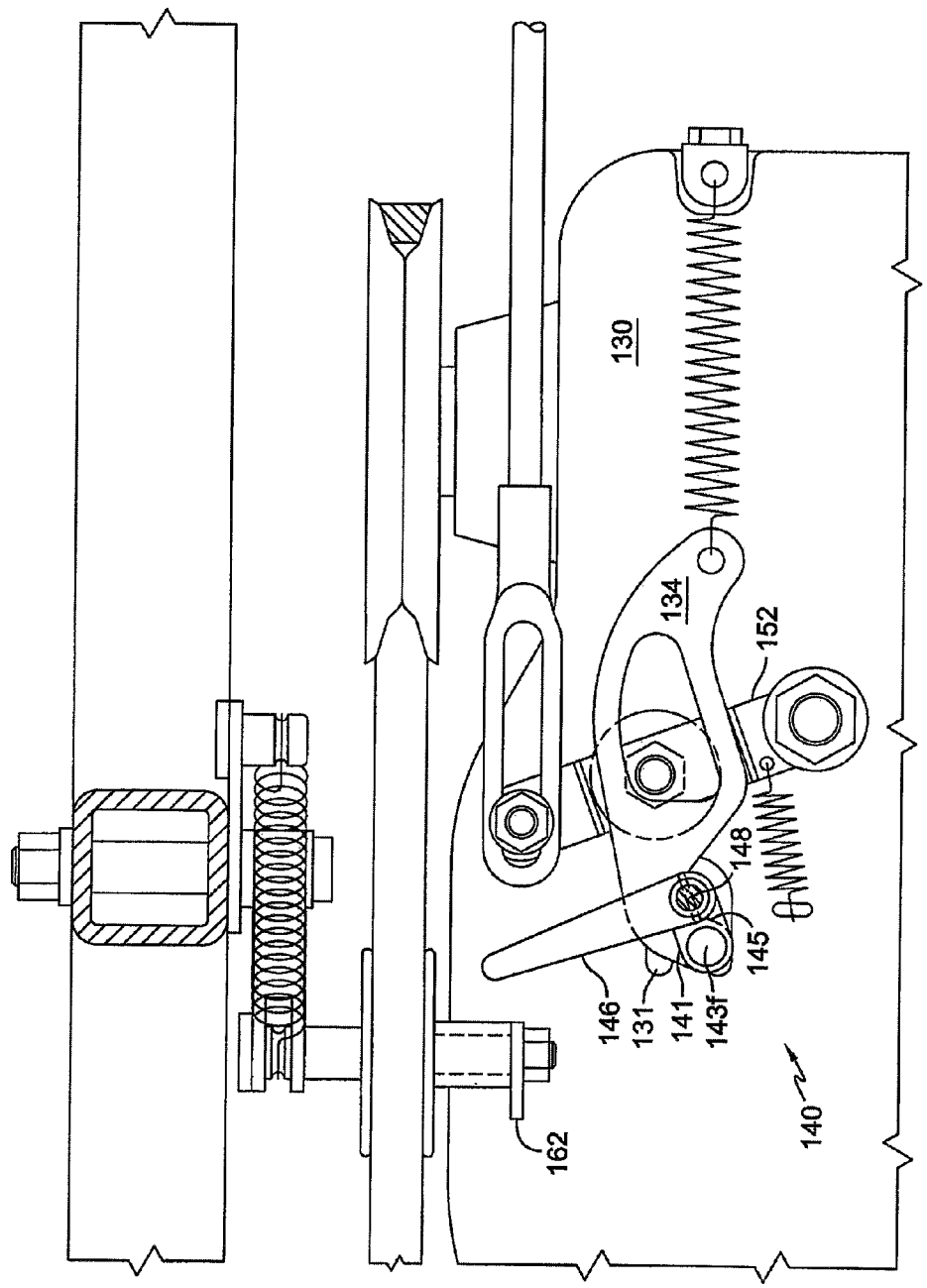
FIG. 8 is a side elevational view of an alternative embodiment of the present invention.
Figure 9:
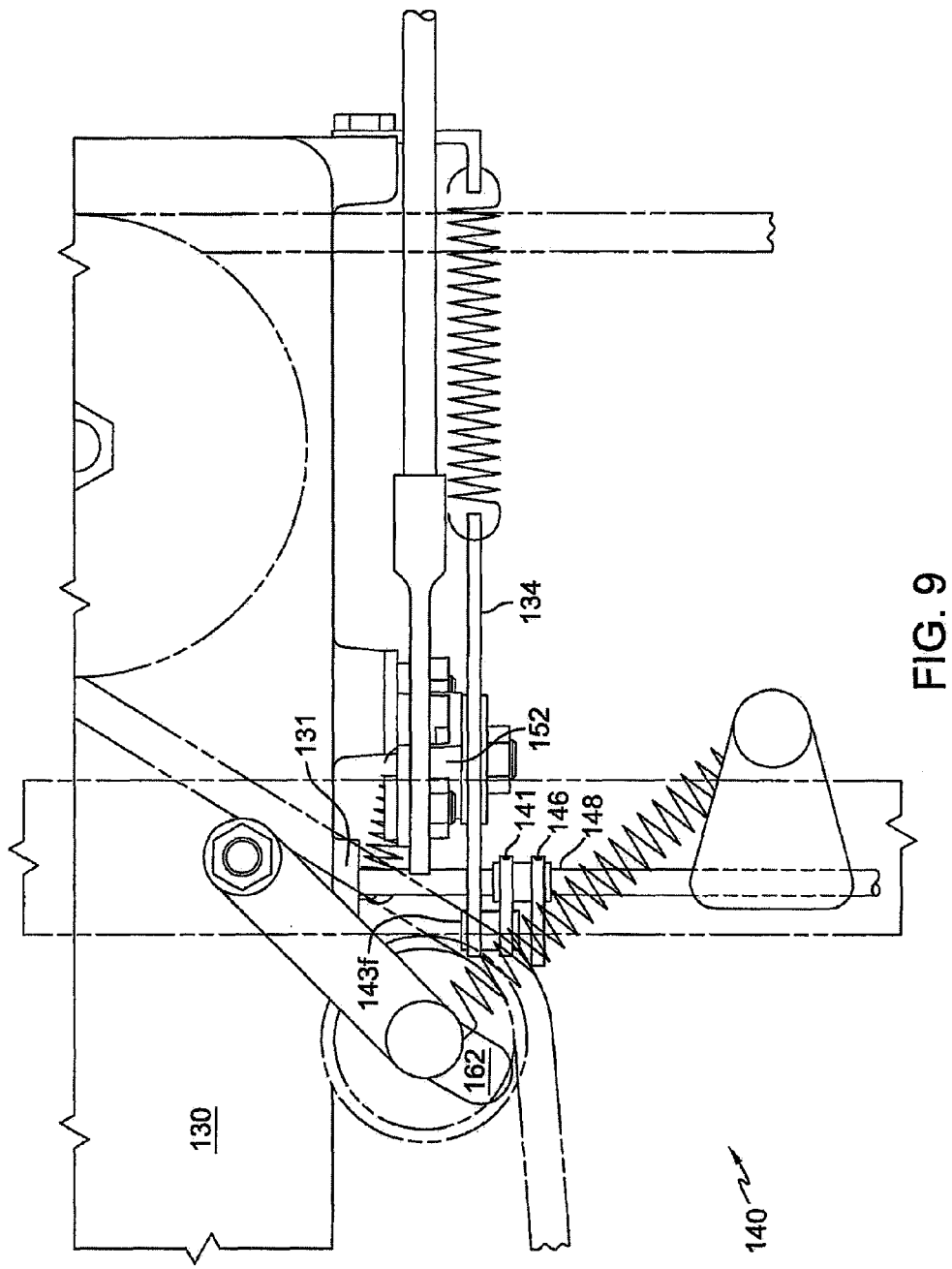
FIG. 9 is a plan view of the embodiment shown in FIG. 8.

The alternative embodiment shown in FIGS. 8 and 9 modifies the structure of release arm 46 to separate its functions of rotating transverse rod 48 and lifting clamp arm 34 out of the over-center position into two separate elements. Specifically, in this embodiment, when striker 162 hits release arm 146 causing rotation of transverse rod 148, such rotation is transferred to a separate link 141 which is engaged to clamp arm 134. Transverse rod 148 is located in a pocket 134 in housing 130 and in a similar pocket in the other transaxle housing (not shown) to engage the emergency brake mechanism of the second transaxle in a similar manner. When clamp arm 134 is lifted out of its over-center position, the structure shown in FIGS. 8 and 9 operates identically to that in the prior embodiment, thus causing rotation of brake arm 152. The other elements of this embodiment can be identical to those described previously. This separation of link 141 and release arm 146 provides additional flexibility in terms of the location of such elements with respect to transverse rod 148. The distance permitted between these two elements is restricted by factors such as the amount of flex that would be introduced to transverse rod 148 by the distance between release arm 146 and clamp arm 134.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

The invention claimed is:

1. A drive apparatus, comprising:
   a prime mover and a first pulley powered by the prime mover;
   a transmission comprising a housing and an input shaft having an external end disposed outside the housing;
   a second pulley disposed on the input shaft;
   a belt connecting the first and second pulleys to transmit force from the prime mover to the transmission;
   a brake mechanism comprising a rotatable pivot rod having one end external to the housing, wherein the pivot rod rotates about its longitudinal axis, and a brake arm assembly disposed external to the housing for engaging and rotating the pivot rod, the brake arm assembly having a first position where the brake mechanism is engaged and a second position where the brake mechanism is disengaged;
   a first bias member engaged to the brake arm assembly and providing a first spring force for biasing the brake arm assembly toward the first position;
   a movable assembly engaged to the belt, and comprising a contact member, whereby tension from the belt retains the contact member in a position away from the brake arm assembly; and
   a second bias member engaged to the movable assembly and providing a second spring force to bias the contact member towards the brake arm assembly, whereby when tension from the belt is removed from the movable assembly, the second bias member forces the contact member into engagement with the brake arm assembly to actuate the brake mechanism.

2. The drive apparatus of claim 1, wherein the brake arm assembly comprises a brake arm member fixed to and pivotable with the one end of the pivot rod.

3. The drive apparatus of claim 2, wherein the brake arm assembly further comprises a clamp arm operatively engaged to the brake arm member, whereby movement of the clamp arm from a first position to a second position causes the brake arm member to rotate the pivot rod.

4. The drive apparatus of claim 3, wherein the clamp arm is retained in the first position by an over-center mechanism comprising a recess formed in the clamp arm and a transverse rod extending from the housing and engaged to the recess when the clamp arm is in the first position.

5. The drive apparatus of claim 4, wherein the brake arm assembly further comprises a release arm engaged to the transverse rod and rotatably fixed to one end of the clamp arm, whereby, when the tension from the belt is removed from the movable assembly, the contact member engages the release arm to cause the release arm to pivot about a longitudinal axis of the transverse rod, thereby lifting the clamp arm recess off the transverse rod.

6. The drive apparatus of claim 3, further comprising a linkage connected to the brake arm member and to a user control, and the clamp arm comprises a slot to permit operation of the brake mechanism independent of the movable assembly.

7. The drive apparatus of claim 6, wherein the linkage comprises a second slot to permit operation of the brake mechanism independent of the user control.

8. The drive apparatus of claim 2, wherein the first bias member comprises a first spring and the second bias member comprises a second spring.

9. The drive apparatus of claim 8, further comprising a third spring engaged to the brake arm member to bias the brake arm assembly to the second position.

10. The drive apparatus of claim 3, further comprising a linkage connected to the brake arm assembly and to a user control, and a slot formed in the linkage to permit operation of the brake mechanism independent of the user control.

11. The drive apparatus of claim 5, wherein the release arm consists of a single member directly engaged to the one end of the clamp arm.

12. The drive apparatus of claim 1, wherein the movable assembly further comprises an idler pulley engaged to the belt.

13. The drive apparatus of claim 1, wherein the transmission comprises a hydraulic transmission.

14. A vehicle having a prime mover disposed on a vehicle frame, comprising:
   at least a first transmission providing output to a vehicle axle and comprising a brake mechanism;
   a drive belt and pulley system for transferring power from the prime mover to the first transmission;
   an idler pulley mechanism comprising an idler pulley engaged to the drive belt and retained in a first position by tension from the drive belt;
   a pivot rod having a longitudinal axis of rotation for actuating the brake mechanism; and
   an emergency brake actuator, comprising:
      a brake arm assembly engaged to one end of the pivot rod for causing rotation of the pivot rod, the brake arm assembly having a first position where the brake mechanism is engaged and a second position where the brake mechanism is disengaged;
      a first bias member engaged to the brake arm assembly for biasing the brake arm assembly toward the first position;
      an actuator connected to the brake arm assembly; and
      a second bias member engaged to the idler pulley mechanism, whereby when tension from the drive belt is removed from the idler pulley, the second bias member forces the idler pulley mechanism into engagement with the actuator.

15. The vehicle of claim 14, further comprising
   a second transmission providing output to a second vehicle axle and comprising a second brake mechanism;
   a transverse rod extending from the first transmission to the second transmission; and
   a second emergency brake actuator engaged to the second transmission and comprising a second brake arm assembly, wherein engagement of the idler pulley mechanism with the actuator rotates the transverse rod to actuate the second brake mechanism.

16. A drive apparatus, comprising:
   a prime mover and a first pulley powered by the prime mover;
   a transmission comprising a housing, an input shaft, a second pulley disposed on the input shaft, and a brake mechanism comprising a rotatable pivot rod having one end external to the housing, wherein the pivot rod rotates about its longitudinal axis;
   a brake arm disposed external to the housing for engaging the one end of the pivot rod, the brake arm having a first position where the brake mechanism is engaged and a second position where the brake mechanism is disengaged;
   a belt connecting the first pulley to the second pulley to transmit force from the prime mover to the input shaft;
   a first bias member for biasing the brake arm to the first position;
   a second arm engaged to the brake arm and capable of rotating the brake arm;

an emergency brake assembly engaged to the belt, whereby tension from the belt retains the emergency brake assembly in a first, disengaged position; the emergency brake assembly further comprising a second bias member to bias the emergency brake assembly towards a second, engaged position, whereby when tension from the belt is removed from the emergency brake assembly, the second bias member forces the emergency brake assembly to the second position which causes the brake arm to rotate to its first position where the brake mechanism is engaged.

17. A vehicle, comprising:
a prime mover driving an input pulley connected to a drive belt;
a first transmission driving a first wheel of the vehicle, the first transmission comprising a first housing, a first input shaft, a first drive pulley disposed on the first input shaft and driven by the drive belt, and a first brake arm located external to the first housing and movable between an engaged position and a disengaged position;
a first emergency brake actuator disposed external to the first transmission and engaged to the first brake arm;
a second transmission driving a second wheel of the vehicle, the second transmission comprising a second housing, a second input shaft, a second drive pulley disposed on the second input shaft and driven by the drive belt, and a second brake arm located external to the second housing, and movable between an engaged position and a disengaged position;
a second emergency brake actuator disposed external to the second transmission and engaged to the second brake arm; and
a release member capable of actuating both the first and second emergency brake actuators when a predetermined condition is met, without any input from an operator of the vehicle.

18. The vehicle of claim 17, wherein the predetermined condition is the breakage of the drive belt.

19. The vehicle of claim 18, further comprising a movable assembly engaged to the drive belt and moveable between a first position and a second position, whereby tension from the drive belt retains the movable assembly in the first position, the movable assembly further comprising a contact member and a bias member engaged to the movable assembly to bias the movable assembly towards the second position whereby, when tension from the drive belt is removed from the movable assembly, the bias member forces the contact member into engagement with the release member to engage the first and second emergency brake actuators.

20. The vehicle of claim 18, wherein the first emergency brake actuator comprises a first clamp arm disposed external to the first housing and operatively engaged to the first brake arm, whereby movement of the first clamp arm from a first position to a second position causes the first brake arm to move to the engaged position; and the second emergency brake actuator comprises a second clamp arm disposed external to the second housing and operatively engaged to the second brake arm, whereby movement of the second clamp arm from a first position to a second position causes the second brake arm to move to its engaged position.

21. The vehicle of claim 19, wherein the movable assembly comprises an idler pulley engaged to the drive belt.

22. The vehicle of claim 19, wherein the first and second transmissions comprise hydraulic transmissions and the bias member comprises a spring.

23. The vehicle of claim 17, further comprising a first brake linkage engaged to the first brake arm to permit a vehicle operator to move the first brake arm to its engaged position and a second brake linkage engaged to the second brake arm to permit the vehicle operator to move the second brake arm to its engaged position.

* * * * *